United States Patent [19]

Erspamer et al.

[11] 4,143,467
[45] Mar. 13, 1979

[54] SEMI-AUTOMATIC SELF-CONTAINED MAGNETIC AZIMUTH DETECTOR CALIBRATION APPARATUS AND METHOD

[75] Inventors: James R. Erspamer; John R. Jackson; Roger A. Misch; John L. Waldrop, all of Phoenix, Ariz.

[73] Assignee: Sperry Rand Corporation, New York, N.Y.

[21] Appl. No.: 901,886

[22] Filed: May 1, 1978

[51] Int. Cl.² ............................................. G01C 17/38
[52] U.S. Cl. ...................................... 33/356; 73/1 E
[58] Field of Search .............. 33/317 D, 356; 73/1 E, 73/178 R

[56] References Cited

U.S. PATENT DOCUMENTS

4,031,630  6/1977  Fowler .................................. 33/356
4,091,543  5/1978  Lapeyre ................................ 33/356

*Primary Examiner*—Donald O. Woodiel
*Attorney, Agent, or Firm*—Howard P. Terry; Albert B. Cooper

[57] ABSTRACT

Apparatus for calibrating the magnetic azimuth detector of a gyromagnetic compass system utilizes the system gyro to provide a plurality of heading references to which the corresponding heading outputs of the magnetic azimuth detector are compared to provide cardinal and inter-cardinal error data from which one cycle and two cycle compensation coefficients are derived. The gyro heading references are compensated for gyro drift in accordance with the proportionate drift occurring with respect to a particular heading reference with respect to the total gyro drift occurring during the calibration procedure in accordance with coincident initial and final heading reference points. The calibration is effected by orienting the aircraft in which the gyromagnetic compass system is installed at the plurality of headings to provide the gyro reference and magnetic azimuth detector data.

29 Claims, 5 Drawing Figures

SEMI-AUTOMATIC SELF-CONTAINED MAGNETIC AZIMUTH DETECTOR CALIBRATION APPARATUS AND METHOD

BACKGROUND OF THE INVENTION

1. Field of the Invention

The invention relates to magnetic azimuth detectors, otherwise known as flux valves, particularly with respect to error compensation apparatus therefor.

2. Description of the Prior Art

Gyromagnetic compass systems utilizing a directional gyroscope slaved to a magnetic azimuth detector or flux valve have long been utilized in aircraft to provide azimuthal data. As is known, the flux valve is subject to errors such as index error as well as one and two cycle errors caused, inter alia, by misalignment of the flux valve in the aircraft, by spurious magnetic fields present in the aircraft and by anomolies of the electrical transmission systems utilized in transmitting the flux valve data. Generally misalignment or index error is eliminated by careful installation of the flux valve in the aircraft or by utilizing a pre-indexed flux valve which is precisely mounted on an installation plate by the device manufacturer, the plate being provided with a reference mark that establishes the reference magnetic axis of the valve. Alternatively, electrical compensation may be utilized to correct the index error in a well known manner.

An early prior art procedure for calibrating and compensating the compass system entailed "swinging the compass" with respect to a "compass rose". The compass rose is a pattern of radial lines painted on a concrete surface located in a generally remote magnetically stable area in the vicinity of an airport, the compass rose lines being precisely oriented along the cardinal and inter-cardinal headings. Prior art compass rose patterns typically utilize as many as 24 calibrator headings. Swinging the compass comprises orienting the aircraft precisely with respect to the plurality of compass rose reference lines with respect to which flux valve errors are determined. Utilizing charts or mathematical formulas, compensation values are set into potentiometers to reduce the flux valve errors. It is appreciated that such a procedure is necessarily exceedingly time consuming as well as requiring sizable trained ground crews both for precisely orienting the aircraft along the heading lines and for performing the compensation adjustments once the errors are determined. Such procedure additionally requires accurately surveyed swing sites.

Other prior art apparatus and procedures have been developed for calibrating the gyromagnetic compass system of an aircraft. These methods entail positioning the aircraft in a magnetically stable area and measuring the earth's magnetic field at the location of the flux valve utilizing external field measuring equipment. The compass calibration apparatus included means for injecting currents into the flux valve so as to cancel the earth's field therein in accordance with its measured value and thereafter applying currents to the valve so as to generate precise fields simulating the earth's magnetic field at the desired cardinal and inter-cardinal calibration headings. Flux valve errors measured with respect to these artificially generated "electrical swinging" fields are utilized to adjust the compensation potentiometers so as to reduce the errors. This prior art field cancellation and electrical swinging procedure requires significant amounts of ground equipment as well as sizable ground crews to perform the procedures. Considerable time is also required for these complex compass calibration processes.

Another prior art approach to compass system calibration is the two heading random swing. In this procedure the aircraft is approximately aligned along a randomly oriented line at a magnetically stable area and the corresponding flux valve output is recorded. The misalignment of the aircraft with respect to the heading line is measured by the ground crew and entered into the system. The aircraft is then reoriented to approximate alignment along the line in the opposite direction with the flux valve output and misalignment data again obtained. With these data a measure of the earth's field is derived and utilized in providing an earth's field cancelling current to the flux valve in a manner generally similar to that described above. Thereafter an electrical swing of the type described is performed in order to obtain the errors utilized for compensation. It is appreciated that the two heading random swing is also undesirably time consuming, requires a trained ground crew and utilizes complex and expensive ground support equipment.

Thus it is appreciated that the magnetic azimuth detector is an integral part of gyromagnetic compass systems utilized in aircraft. Mounting of the detector in an aircraft, which has numerous ferromagnetic components that distort the earth's field, induces one and two cycle errors in the flux valve output. As described above, prior art compensation of these errors has involved calibration procedures during which ground equipment is connected to the aircraft, specially trained personnel thereafter performing the calibration by manually rotating the aircraft or electrically rotating the flux valve and adjusting the potentiometers on the equipment. The conventional manual compass swings required special equipment, such as plum bobs and alignment equipment, and additionally were time consuming. Although the prior art electrical swings could meet accuracy requirements, such procedures required considerable test equipment and highly trained operators to achieve satisfactory results.

SUMMARY OF THE INVENTION

The invention comprises apparatus and method for compensating the flux valve of the gyromagnetic compass system utilized in aircraft. The invention contemplates orienting the aircraft in accordance with a plurality of headings and measuring the flux valve output and the gyro output at each heading to provide a corresponding plurality of heading error signals. The heading references provided by the gyro are compensated for the gyro drift that occurs during the calibration process. The heading error signals obtained thereby are employed to generate the flux valve compensation coefficients utilized in compensating the heading output of the flux valve.

By utilizing the invention as described, the above delineated disadvantages of the prior art are obviated. The present invention permits performing a complete compass calibration swing to a high degree of accuracy in a time that is relatively short compared to the time required for prior art procedures. Additionally, no personnel other than the pilot is required and the pilot need only perform relatively simple maneuvering of the aircraft in response to commands provided by the apparatus of the invention. Furthermore, the invention has eliminated the use of special test equipment such as ground support equipment.

BRIEF DESCRIPTION OF THE DRAWINGS

FIG. 2, comprising

DESCRIPTION OF THE PREFERRED EMBODIMENT

The present invention comprises self-contained automatic compass calibration apparatus and method for compensating the flux valve output of a gyro magnetic compass system of the type commonly utilized in commercial and military aircraft. Conveniently, the apparatus of the invention utilizes the directional gyroscope of the compass system to provide heading reference data for the calibration procedure. The system is calibrated by flying the aircraft successively to a plurality of headings storing appropriate data at each heading. In fixed wing aircraft the pilot flies the aircraft to the successive headings in a relatively short period of time. The invention is particularly suitable for use in helicopters because of the ease of lifting and rotating the craft to the calibration headings. In the helicopter application the aircraft may fly or hover at the various headings or may be set down on each thereof. In the preferred embodiment a pattern of nine headings spaced 45° apart is utilized as the optimum number of data points for the particular compass system utilized. The number of data points is a compromise between minimizing the number thereof and maximizing the resulting accuracy of the compass calibration. In the preferred embodiment the cardinal and inter-cardinal compass headings of 0°, 45°, 90°, 135°, ... 315° and 360° are utilized. It is appreciated that other patterns of calibration headings may be utilized to the same effect.

The preferred embodiment of the invention compensates the system for one and two cycle heading errors, the north-south and east-west one cycle errors being compensated by data gathered at the 0°, 90°, 180° and 270° cardinal headings. The two cycle cardinal error is compensated from the data gathered at the 0°, 90°, 180°, and 270° cardinal headings and the two cycle intercardinal error is compensated by the data taken at the intercardinal headings 45°, 135°, 225°, and 215°. The data recorded at the coincident initial and final headings of 0° and 360°, respectively, are utilized to compute the gyro drift from the beginning and end points of the calibration procedure so as to compensate the gyro data for drift at the calibration headings.

In the preferred embodiment, the invention comprises a portion of a gyro-stabilized compass system wherein the gyro output heading is slaved to the magnetic heading. Such systems are commonly known for use in aircraft, an example of such a system being described in U.S. Pat. No. 3,691,643, issued Sept. 19, 1972, entitled "Gyromagnetic Compass System" by D. H. Baker, D. R. Brickner and K. P. Manning and assigned to the present assignee. To initiate the compass calibration procedure, the compass system is set to the CALIBRATE mode in a manner to be later described. In the CALIBRATE mode the system is disengaged for normal system operation and is configured to begin the calibration procedure.

Figure 1:
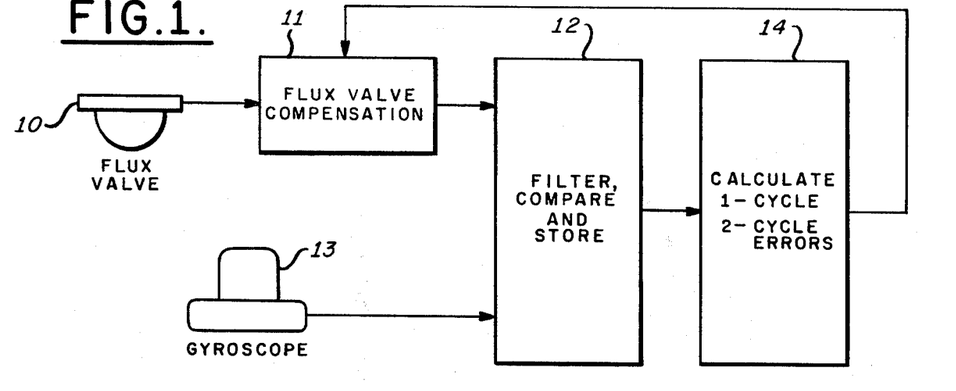
FIG. 1 is a broad schematic block diagram of the compass system calibration apparatus of the present invention.

Referring to FIG. 1, the calibration arrangement of the present invention is illustrated in broad block schematic form. The output of the flux valve 10 of the system is applied through a flux valve compensation block 11 to a block 12 wherein data are filtered, compared and stored. The heading reference output from the directional gyroscope 13 of the system is also applied to the block 12. The output from the block 12 is applied to a calculate block 14 wherein computations are performed to provide the compensation signals for the one and two cycle flux valve errors. The compensation signals are applied to the block 11 to compensate the output of the flux valve 10 so as to provide a compensated heading output signal.

In the calibration procedure of the invention, the aircraft is flown or set down at each of the calibration magnetic headings at the predetermined increments. At each heading, the heading output of the flux valve 10 and the heading output of the gyroscope 13 are filtered in the block 12. For each heading the filtered flux valve signal is compared to the filtered gyro heading which is utilized as a reference. The resulting difference or error angle is averaged for a length of time and stored. At the same time magnetic field strength is determined from the flux valve data and stored along with accumulated time. This process is repeated for each of the predetermined headings ending on the same magnetic heading as the initial heading. At the final heading, gyro drift is computed from the beginning and end points based on gyro headings, magnetic headings and the stored total time. The individually stored average errors are then modified to compensate for the drift of the gyroscope 13. The compensated individually stored average errors are then utilized to calculate the one cycle and two cycle error angles.

Flux valve compensation may be effected by various means and procedures depending on the system configuration. In the preferred embodiment, stored compensation coefficients are updated with the newly acquired compass swing data in a manner to be described in detail herein below. Briefly, the stored field strength values are averaged and utilized to determine the vector length of the single cycle error coefficients. The two cycle error coefficients are also determined and all of the stored coefficients are utilized to compensate the flux valve signals. The compensation as well as the gyro drift calculations are effected in a manner to be described while the aircraft is at the final heading. Additionally, during this time validity tests are performed on the elapsed time, the gyro drift and the compensation coefficients and if all values are within predetermined tolerances then the calibration is considered valid and a signal is generated so to indicate. Thereafter the system is returned to normal operation.

Figure 2A:
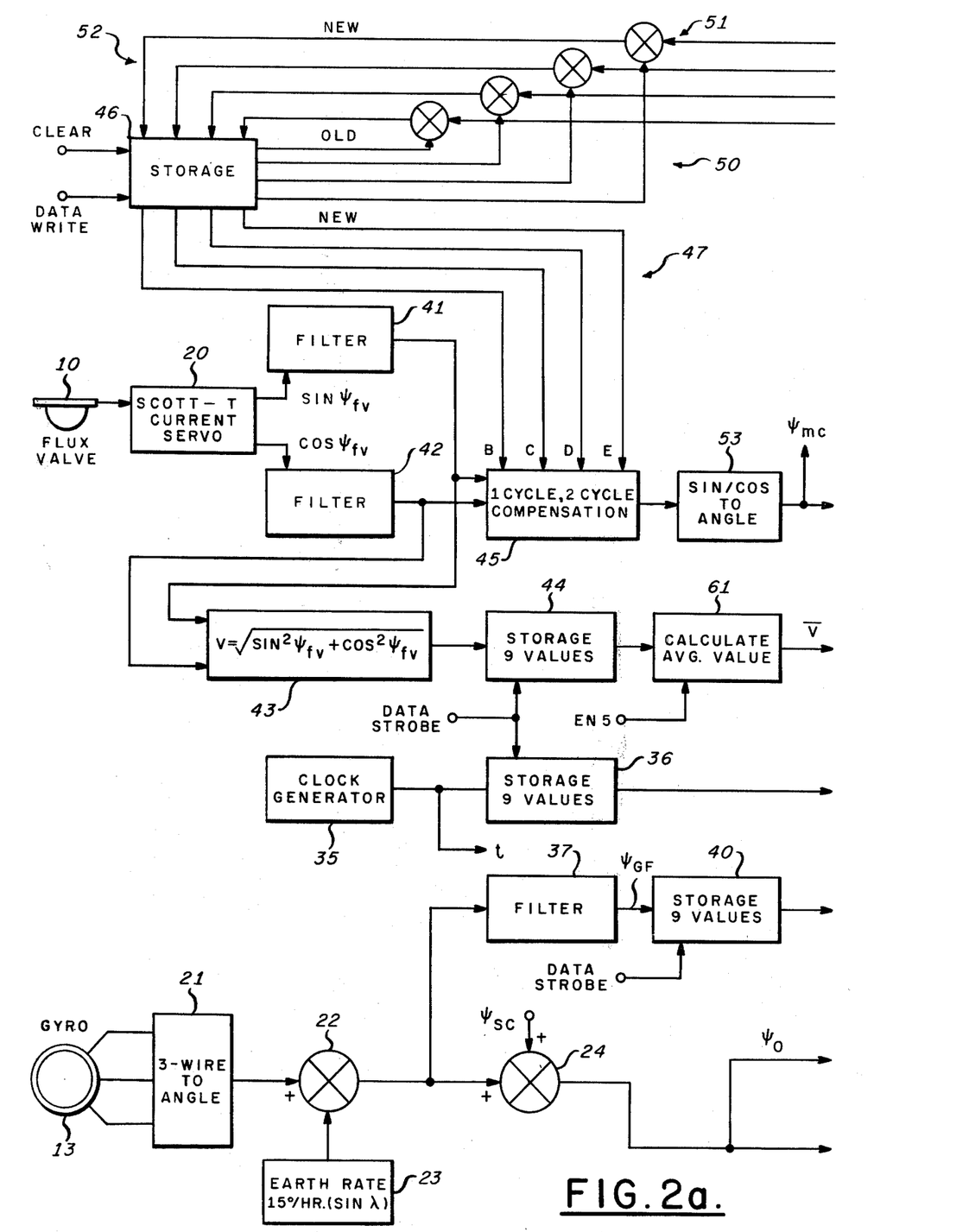
FIGS. 2a and 2b, is a detailed schematic block diagram of the compass system calibration apparatus of the present invention.
Figure 2B:
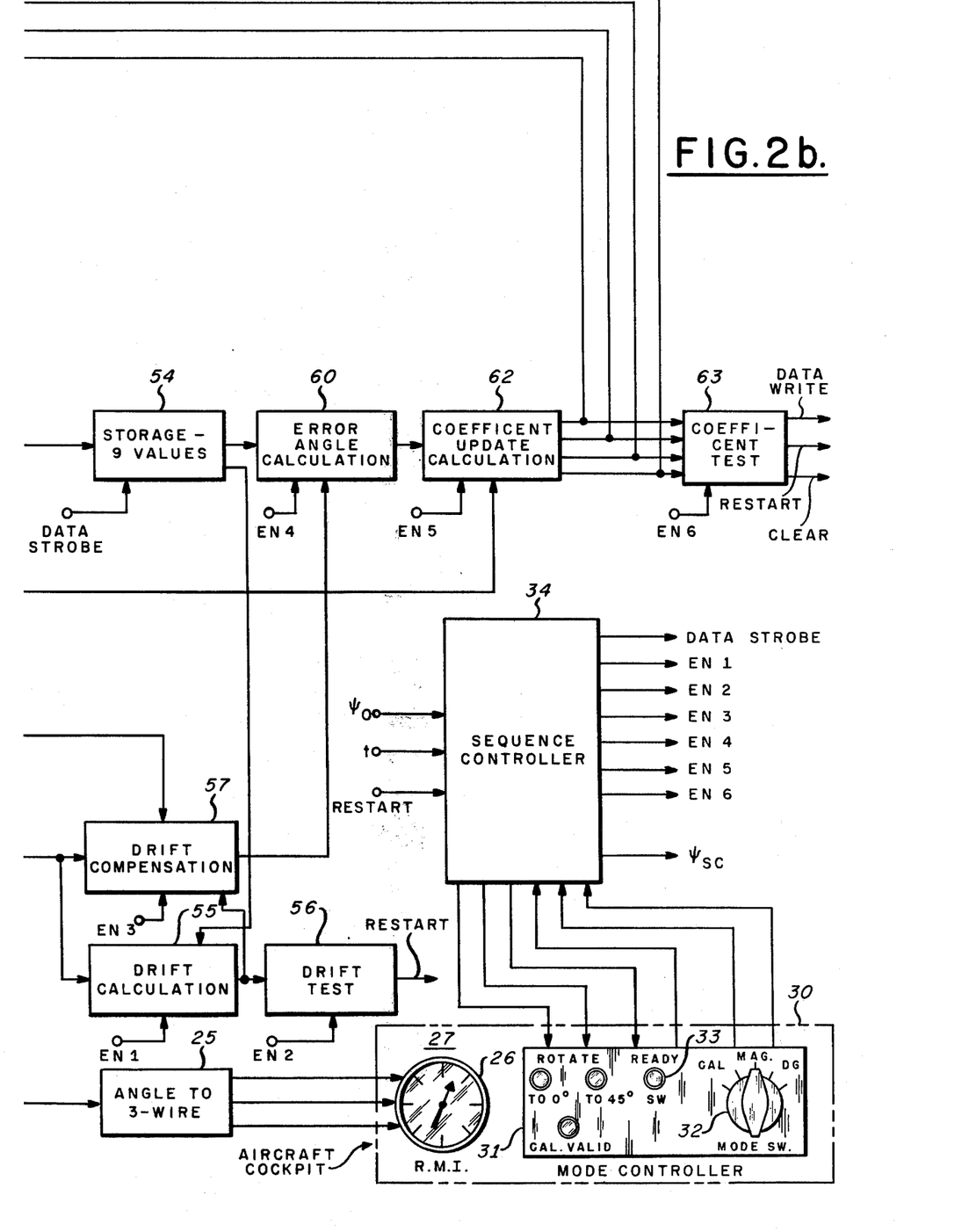

Referring to FIG. 2 a detailed schematic block diagram of the preferred embodiment of the compass systems calibrator of the present invention is illustrated. It will be appreciated that although the embodiment is depicted in terms of computation, storage and control blocks, preferably the invention is embodied as a microprocessor for performing the functions. Although analog signals are provided by the flux valve 10 and the directional gyroscope 13, it is appreciated that these signals are converted into digital format via analog-to-digital converters (not shown) for digital processings and storage in memory locations. It will furthermore be appreciated that the embodiment illustrated in FIG. 2 may alternatively be implemented utilizing analog or digital discrete circuits as well as discrete programmable digital circuitry.

The flux valve 10 of the compass system provides its magnetic heading output signal to a Scott-T/Current Servo combination 20 that in turn provides the sine and cosine components of the flux valve heading output designated as $\sin \psi_{fv}$ and $\cos \psi_{fv}$. The Scott-T/Current Servo 20 may be implemented as described in U.S. Pat. No. 3,678,593 issued July 25, 1972 in the names of D. H. Baker and F. H. Kallio entitled "Compass Systems and Components Therefore Having Autotmatic Field Cancellation" and assigned to the present assignee. The sine and cosine outputs of the current servo 20 are d.c. currents which as described above are converted into digital format for processing in a manner to be described.

The directional gyroscope 13 provides a three wire heading output from a conventional synchro pickoff (not shown) connected therewith to a conventional three-wire-to angle converter 21. As described above the heading reference angle from the converter 21 is transformed into digital format for processing in accordance with the present invention. The heading reference angle from the gyro 13 is compensated at 22 for earth rate in a conventional manner by an earth rate signal from a block 23 which in the present compass system is 15°/hour (sin λ) where λ is the current latitude of the aircraft. In normal operation of the compass system the output of the gyro 13 is slaved to the output of the flux valve 10 via a synchronizing angle signal $\psi_{sc}$ applied at a summing point 24. The slaving function of the system is fully described in said U.S. Pat. No. 3,691,643. The output from the summing point 24 provides the compass system output angle $\psi_o$.

The output signal $\psi_o$ is digital-to-analog converted by means not shown and applied to a conventional angle to three-wire converter 25, the three wire output thereof being utilized to drive the compass card 26 of a remote magnetic indicator (RMI) 27 located in the aircraft cockpit 30. In the calibration mode of operation the synchronizing angle signal $\psi_{sc}$ is utilized to position the compass card 26 in accordance with the calibration procedures to be described.

The gyro magnetic compass system including the self-contained calibration apparatus of the present invention is controlled by a mode controller 31 located in the aircraft cockpit 30. The mode controller 31 includes a mode switch 32 that selectively places the system into a CALIBRATE mode, a MAGNETIC mode or a DIRECTIONAL GYROSCOPE mode as indicated by the legends. The controller also includes a READY SWITCH 33 operated by the pilot in a manner to be described. The controller 31 also includes indicator lamps for commanding the pilot to rotate the craft to 0° or to 45° and additionally for indicating to the pilot that the calibration is valid.

Interconnected with the mode controller 31 is a sequence controller 34 for providing the various control signals utilized by the calibration apparatus. The sequence controller 34 is responsive to the output heading angle signal $\psi_o$ as well as to a clock signal "t" and a "restart" signal. The controller 34 provides a data strobe signal as indicated by the legend as well as a sequence of enabling signals designated as EN1, EN2, . . . EN6. The enabling signals EN1–EN6 are sequentially generated and provided to control sequential operation of the calibration procedure in a manner to be described. The controller 34 also provides the synchronizing angle signal $\psi_{sc}$ to the summing point 24.

In the present embodiment of the invention the compass system is calibrated by sequentially orienting the aircraft to 9 headings spaced 45° apart starting with 0°. The ninth heading of 360° is coincident with the initial heading of 0° so as to provide a measure of drift of the gyroscope 13. Thus it is appreciated that the compass calibration procedure of the present invention utilizes the 4 cardinal and 4 inter-cardinal points of the compass to perform the calibration. For each of the 9 headings the outputs of the flux valve 10 and the gyroscope 13 are stored as well as a measure of the elapsed time from the beginning of the calibration procedure to the time the data point is stored. When the aircraft is oriented at the final heading of 360° compensation coefficients are computed, the gyroscope reference signals are compensated for drift and validity tests are performed on the compensation coefficients, the drift and the total elapsed time in a manner to be explained.

When the mode switch 32 is initially set to the calibrate position and the aircraft is oriented at 0°, the ready switch 33 is engaged which starts a clock generator 35 running. The clock output t from the clock generator 35 is applied as an input to the sequence controller 34 to provide the timing for the calibration procedure. When the aircraft has settled at each of the 9 headings, the sequence controller 34 provides the data strobe signal which causes storage of the present value of time, magnetic heading and gyro heading. Accordingly the 9 values of time at which the magnetic and gyro headings are recorded are stored in storage means 36 in response to the data strobe signal.

The gyro heading reference signal, designated as $\psi_g$, from the summing point 22 is transmitted through a filter 37 for storage in a storage device 40. The filter may comprise a conventional lag filter having a transfer function $$1/(\psi S + 1)^n$$

The filter 37 provides a filtered heading reference signal designated as $\psi g f$. The signal is filtered to remove noise induced by spurious aircraft motion and winds. The storage device 40 stores 9 consecutive values of $\psi g f$ in response to the data strobe signal at the 9 respective headings at which the aircraft settled during the calibration swing.

The sine and cosine components of the magnetic heading angle signal $\psi f v$ from the current servo 20 are applied to respective filters 41 and 42. The filters 41 and 42 smooth the flux valve data by eliminating noise induced by aircraft motion and winds and pendulous motions of the valve 10. In the present embodiment, the filters 41 and 42 average the flux valve data over a large number of data points to provide the filtering action. It will be appreciated that any conventional filtering procedure may be utilized to provide the desired smoothing effect.

The filtered sine and cosine components of the flux valve output are applied to a block 43 which computes the horizontal component of magnetic field intensity as follows:

$$V = \sqrt{\sin^2 \psi_{fv} + \cos^2 \psi_{fv}}$$

The output of the block 43 provides the computed magnetic field strength vector to storage means 44 wherein extant value of the field strength vector at each of the 9 calibration headings is stored in response to the data strobe signal from the sequence controller 34.

The filtered sine and cosine components of the flux valve heading output signal from the filters 41 and 42 are applied to a compensation block 45 wherein the heading output signal from the flux valve 10 is compensated for one cycle and two cycle errors. Assuming that the aircraft error is the form $$\epsilon = B\sin\psi fv + C\cos\psi fv + D\sin 2\psi fv + E\cos 2\psi fv$$

compensation block 45 provides the compensation as follows:

$$\sin\psi mc = (C - \sin\psi fv)(1 + D) + E(B - \cos\psi fv)$$

$$\cos\psi mc = (C - \sin\psi fv)(1 + D)E + (B - \cos\psi fv)$$

where
- $\psi mc$ = compensated magnetic heading angle signal
- $\psi fv$ = uncompensated magnetic heading angle signal
- B, C = one cycle error coefficient signals
- D, E = two cycle error coefficient signals It will be appreciated that one and two cycle error compensation of the type implemented in the block 45 is well known in the art. For example, two cycle error compensation is disclosed and discussed in U.S. Pat. No. 3,938,257 issued Feb. 17, 1976 entitled "Two-Cycle Compensator for Flux Valve Heading Repeater System" by J. R. Erspamer and assigned to the present assignee.

The compensation coefficients B, C, D and E are stored in memory such as the electrically alterable read only memory 46. Once a valid compensation has been executed, the memory 46 continues to provide the compensation coefficients to the compensation block 45 via paths 47 to provide a compensated heading output signal from the blux valve 10 during successive flights. During the calibration procedure, the contents of the memory 46 may be erased by a "clear" signal as indicated by the legend. During calibration the existing values of the compensation coefficients provided on paths 50 are updated at summing junctions 51 to provide the updated or new compensation coefficients on paths 52. The new compensation coefficients on the paths 52 are applied as inputs to the memory 46 and are entered therein by a "data write" control input to the memory 46 as indicated by the legend.

The compensated sine and cosine components of the magnetic heading angle signal from the flux valve 10 provided by the compensation block 45 are applied to a conventional sine/cosine-to-angle converter 53 that converts the compensated sine and cosine components to the compensated magnetic headings angle $\psi mc$ as follows:

$$\psi mc = \arctan(\sin\psi mc)/(\cos\psi mc)$$

The $\psi mc$ signal is utilized in the gyromagnetic compass system in the normal operating mode thereof to provide the slaving signal for the output of the gyro 13 via apparatus not shown and generally as described in said U.S. Pat. No. 3,691,643.

The compensated magnetic heading angle signal $\psi mc$ is applied to storage means 54 that stores the extant values thereof at the calibration headings in response to the data strobe signal from the sequence controller 34.

In operation the pilot flies the aircraft sequentially to the 9 calibration headings and in the case of the helicopter, preferably flies the aircraft to any site relatively isolated from magnetic structures where the aircraft may be set down. With the mode switch 32 set to "CALIBRATE" the aircraft is oriented to a 0° heading as indicated on the RMI 27 and the ready switch 33 is engaged. The values of $\psi$ mc, $\psi$ gf, V, and t are stored in the storage devices 54, 40, 44 and 36 respectively in response to the data strobe signal as described above. The data strobe signal is issued by the sequence controller 34 after sufficient time has elapsed for the filters 41 and 42 to perform the above described averaging function as determined by the clock signal t. The sequence controller 34 then applies, by conventional means, an angle signal $\psi$ sc equivalent to −45° to the summing point 24. The compass card 26 in response thereto rotates to −45° and the sequence controller 34 illuminates the rotate to 0° indicator lamp on the mode controller 31. In response to this indication the pilot rotates the craft until the RMI 27 again indicates 0°. The craft is then oriented to the inter-cardinal heading of 45°. In response to the pilot again engaging the ready switch 33, the above described data gathering procedure is performed storing a second set of data in the storage devices. Thereafter the sequence controller 34 again offsets the compass card 26 by −45° and the pilot again rotates the aircraft so as to return the compass card 26 to the 0° indication. The craft is then at the cardinal heading of 90°. This sequence is continued until the craft returns to 0° (360°) to complete the data gathering sequence at the ninth calibration heading.

At each heading the sequence controller 34, by conventional means in response to the $\psi_o$ signal determines if the pilot has actually achieved the desired 45° aircraft rotation. If the pilot has not so achieved the desired rotation, the difference between the desired heading and the heading actually achieved is utilized to compensate the next offset signal to the RMI 27 in a manner such that the pilot achieves the next heading as well as each cardinal and inter-cardinal heading within a predetermined tolerance.

Although the use of the ready switch 33 by the pilot simplifies the filtering and circuitry, or alternatively software, to accomplish the calibration, it is not a system requirement. The computer or hardware system embodying the invention can determine, by conventional means, in response to the $\psi_o$ signal, when the aircraft is at the proper heading by determining when the heading is achieved and the turn rate is zero. The system can then automatically filter and store the data when these conditions are met rather than rely on a pilot interface. The pilot would then only require a signal to indicate when to fly to a new heading.

When the aircraft attains the final heading of 360° and the data gathering sequence is complete, the compensation computations with respect to the stored values in the storage devices 36, 40, 44 and 54 are performed. The computations are controlled by the sequence controller 34 via the sequentially generated enable signals EN1, EN2 ... EN6.

A drift calculation block 55 when enabled by EN1 performs a drift calculation in response to the gyro heading values $\psi$ gf at the initial and final headings as provided by storage 40 and in response to the compensated magnetic headings angles ψ mc at the initial and final headings as provided by the storage device 54 as follows:

$$\text{DRIFT} = (\psi\, GF9 - \psi\, GF1) - (\psi\, mc9 - \psi\, mc1)$$

where
- $\psi\, GF9$ = filtered gyro heading at final zero degree heading
- $\psi\, GF1$ = filtered gyro heading at initial zero degree heading
- $\psi\, mc9$ = filtered, compensated magnetic heading at final zero degree heading
- $\psi\, mc1$ = filtered, compensated magnetic heading at initial zero degree heading.

The result of the drift calculation is applied to a drift block 56 which is enabled by the EN2 signal from the sequence controller 34. In the drift test the total drift of the gyro 13 during the calibration procedure as computed in the block 55, is compared to a predetermined threshold. If the drift exceeds the threshold the calibration is considered unreliable and a restart signal is applied to the sequence controller 34 so as to re-perform the data gathering sequence described above. If the drift is less than the threshold the compensation data processing proceeds. In the system of the present embodiment, the total gyro drift during the swing is compared against a maximum of plus or minus 2°. If the gyro 13 has drifted more than this amount in the 8 to 10 minutes normally required to complete a swing, the gyro data is considered unreliable as a heading reference. If the total drift exceeds the threshold, the pilot is directed via the mode controller 31 to repeat the compass swing.

If the value of drift is within the acceptable limit, each gyro heading ψ gf stored in the storage device 40 for each of the swing headings is compensated for drift at drift compensation block 57. The drift compensation block 57 is responsive to the values of gyro headings stored at 40, the values of time stored at 36 and the drift value calculated at 55. In response to the EN3 signal from the sequence controller 34 the drift compensation block 57 performs the following drift compensation computations on the cardinal and inter-cardinal gyro heading data signals ψ gf as follows:

$$\psi\, GC45 = \psi\, gf45 + \text{DRIFT}\,(t45/tsum)$$

$$\psi\, GC90 = \psi\, gf90 + \text{DRIFT}\,(t90/tsum)$$

$$\psi\, GC315 = \psi\, gf315 + \text{DRIFT}\,(t315/tsum)$$

where
- $\psi\, GCxx$ = drift compensated filtered gyro heading at heading xx
- $\psi\, gfxx$ = uncompensated filtered gyro heading at heading xx
- txx = the accumulated time at heading xx at which the gyro heading ψ gfxx was recorded
- tsum = total accumulated time from initial 0° heading to final 0° heading.

After the reference headings have been established by the computations 57, the magnetic heading errors at each of the 8 cardinal and inter-cardinal headings are computed at 60. The block 60 is responsive to the stored compensated magnetic heading angles from the storage device 54, to the drift compensated gyro heading references from 57 and to the enabling signal EN4. The computations 60 determines the magnetic heading error at each of the swing headings in response to EN4 as follows:

$$\epsilon\, 00 = \psi\, mc00 - \psi\, GC00$$

$$\epsilon\, 45 = \psi\, mc45 - \psi\, GC45$$

$$\vdots$$

$$\epsilon 315 = \psi\, mc315 - \psi\, GC315$$

and $$\epsilon NS = \frac{\epsilon 180 - \epsilon 00}{2}$$

$$\epsilon EW = \frac{\epsilon 270 - \epsilon 90}{2}$$

$$\epsilon CRD = \frac{-\epsilon 00 + \epsilon 90 - \epsilon 180 + \epsilon 270}{4}$$

$$\epsilon IC = \frac{-\epsilon 45 + \epsilon 135 - \epsilon 225 + \epsilon 315}{4}$$

where
- $\epsilon$ xx = magnetic heading error at heading xx
- $\psi$ MCxx = compensated magnetic heading at heading xx
- $\psi$ GCxx = drift compensated gyro heading at heading xx
- $\epsilon$ NS = North - South one cycle error
- $\epsilon$ EW = East - West one cycle error
- $\epsilon$ CRD = Cardinal two cycle error
- $\epsilon$ IC = Inter-cardinal two cycle error During the computation interval controlled by EN5 the average magnetic field strength is computed and the error coefficient update values are calculated. Computation block 61, responsive to the magnetic field strength values stored at 44, computes the value $\overline{V}$ in response to EN5 as follows:

$$\overline{V} = (V_0 + V_{45} + V_{90} + \ldots + V_{315})/8$$

The magnetic field strength vector $\overline{V}$ provided by the computations 61 and the heading errors provided by the computations 60 are applied to a computation block 62 to provide the compensation coefficient update values in response to EN5 as follows:

$$B\mu = \overline{V}\tan \epsilon\, EW$$

$$C\mu = \overline{V}\tan \epsilon\, NS$$

$$D\mu = 2\tan \epsilon\, IC$$

$$E\mu = \tan \epsilon\, CRD$$

where
- $B\mu$ = east-west one cycle coefficient
- $C\mu$ = north-south one cycle coefficient
- $\overline{V}$ = average magnitude of field strength vector
- $D\mu$ = inter-cardinal two cycle error coefficient
- $E\mu$ = cardinal two cycle error coefficient The coefficient update values are added to the corresponding old coefficients at 51 with the new coefficient values being stored in the memory 46 to provide the coefficients for compensating the output of the flux valve 10 for one and two cycle errors. The updating performed is as follows:

$$B_{new} = B_{old} + B\mu$$

$$C_{new} = C_{old} + C\mu$$

$$D_{new} = D_{old} + D\mu$$

$$E_{new} = E_{old} + E\mu$$

It will be appreciated that the B and C coefficients contain a factor $\overline{V}$ for earth's field strength which eliminates the necessity to perform a compass swing if the aircraft is operated at a latitude different than that at which the original or initial compass swing was performed.

The error coefficients provided by the block 62 are tested in a block 63 in response to EN6 to ensure that they are within certain tolerances. Two thresholds are utilized against which the error coefficients are tested. The lower threshold is established in accordance with the calibration accuracy desired and the upper threshold is determined by the largest practical error that will be encountered in the particular application. Any error larger than the second threshold is considered to be caused by false data in the system or an improper calibration. If the update coefficients are lower than the first threshold value then the coefficients are added to the existing coefficients in the memory 46, the resultant new coefficients being utilized to compensate the system. When this occurs the coefficient test block 63 issues the data write signal to the memory 46 resulting in the storage of the updated compensation coefficients. Additionally, the sequence controller 34 energizes the calibration valid lamp on the controller 31 signalling the pilot that the calibration is valid and that the system can be returned to normal operation.

If the coefficients are between the first and second thresholds, the coefficients are added to the existing coefficients but the calibration procedure is repeated to refine the calibration accuracy. Thus, the coefficient test block 63 issues the data write signal to the memory 46 and the restart signal to the sequence controller 34. If, however, the coefficients exceed the higher threshold value, the memory 46 is erased and a new calibration is performed. When this occurs the coefficient test block 63 issues the clear signal to the memory 46 and the restart signal to the sequence controller 34.

Figure 3A:
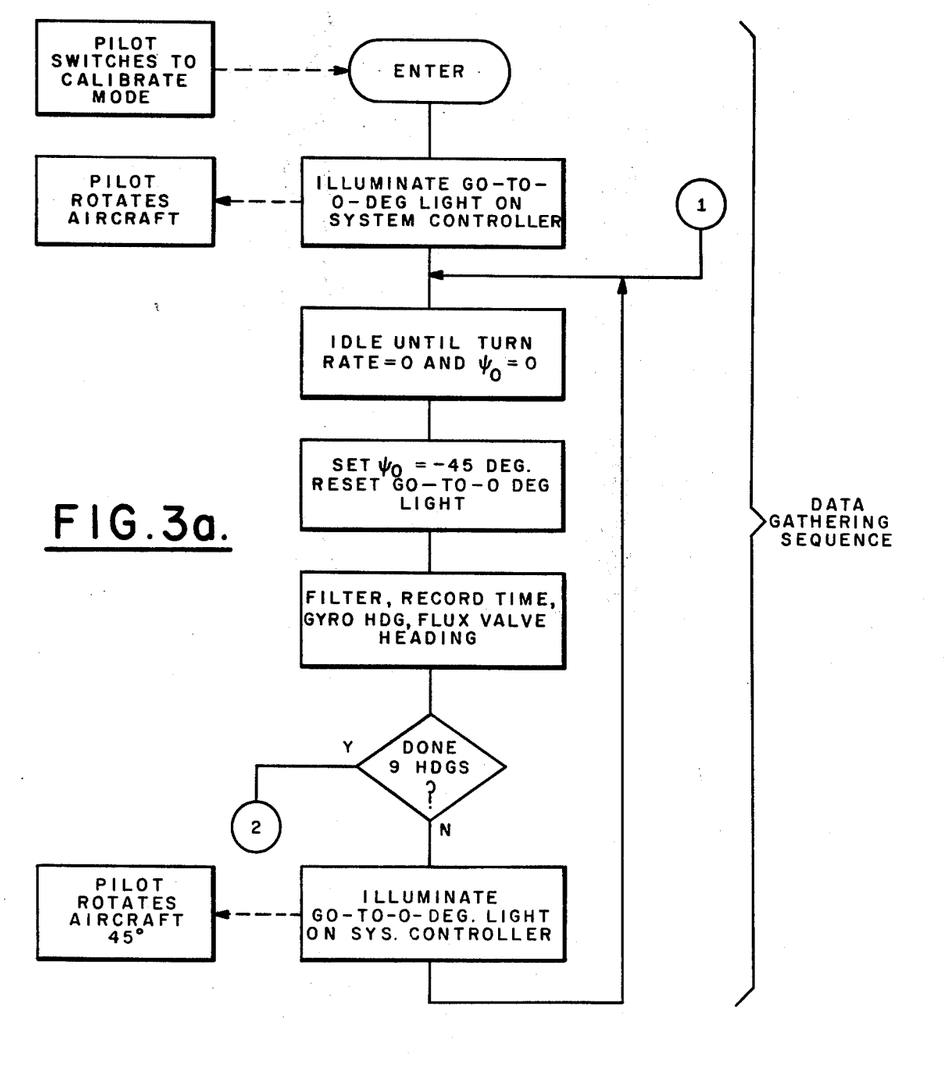
FIGS. 3a and 3b are flow diagrams illustrating the operation of the apparatus of the present invention.
Figure 3B:
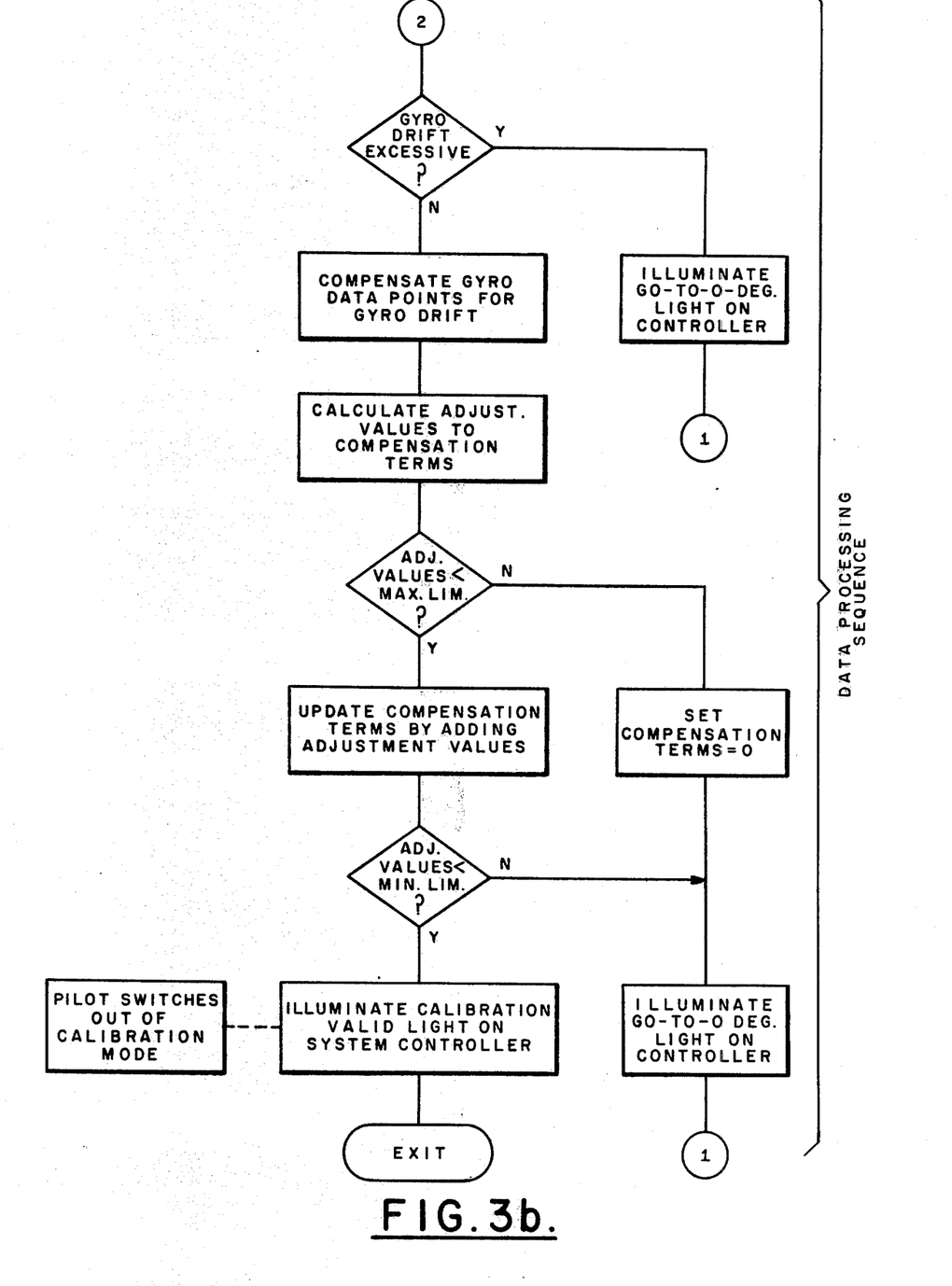

Referring to FIGS. 3a and 3b, flow charts indicating the various manual and computation steps effected in practicing the invention are illustrated. The flow diagrams depict the novel compass calibration process performed by the above described apparatus. It is appreciated that differently configured apparatus from that described above may also be utilized in practicing the inventive method illustrated in the flow diagrams.

In the above described apparatus, blocks 56 and 63 are utilized for performing drift and coefficient tests respectively. It will be appreciated that by apparatus, now shown, the elapsed time may also be tested to determine that the procedure is completed within a permissably short period of time. A time threshold of, for example, 15 minutes may be utilized to determine validity of a calibration procedure.

The above described invention achieves automatic calibration of a magnetic reference heading system in an aircraft simply by orienting the aircraft to the various calibration headings. In fixed wing aircraft the pilot rapidly executes the compass calibration merely by flying the aircraft at each of the calibration headings which are required to be held for only a few seconds. Thus the compass calibration procedure is relatively short so that the gyro drift does not become excessive. Additionally, the eight sided compass swing circular course is relatively small and therefore may be considered to be accomplished in a fixed magnetic field with substantially zero magnetic field deviation. In a helicopter the pilot may either hover or set down at the calibration headings. The pilot, by himself if desired, merely flies to an area free of local magnetic disturbances to perform the swing which may be achieved with or without touching down. With the preferred embodiment of the invention a complete swing is performed to at least an accuracy of ±0.5 degrees in only eight to ten minutes. Typically compass calibrations utilizing the inventions are performed in less than 15 minutes to an accuracy of ±0.3 degrees error maximum. The invention permits accurate and rapid compass calibration during aircraft operation without utilizing auxiliary test equipment or additional personnel.

The invention described hereinabove comprises apparatus and method to compensate for single cycle and two cycle errors caused by magnetic disturbances in the vicinity of the flux valve. Index error or misalignment of the flux valve axis with the aircraft axis will not be detected or compensated utilizing these techniques. In a practical installation the flux valve is preferably mechanically aligned with the aircraft during initial installation.

It will be appreciated from the foregoing that the present invention may be implemented by analog circuits, discrete digital circuits, discrete programmed digital apparatus as well as by programmed microprocessor circuits. The invention may also be practiced utilizing a digital computer programmed in accordance with the above deliniated computations. All of the apparatus illustrated in FIG. 2 with the exception of the components 10, 13, 20, 21, 25 and 30 may be implemented by the programmed computer. The coding for implementing the program may be readily prepared by normally skilled programmers utilizing the material herein above provided. The appended claims are construed to cover all of these alternative embodiments of the invention.

The above described embodiment of the invention was explained in terms of offsetting the compass card 26 minus 45° from the 0° indicium whereby the pilot rotates the aircraft so that the compass card 26 is returned to 0° for each calibration heading. It will be appreciated that the alternative aircraft maneuvering procedures may be utilized in practicing the invention. For example, the compass card 26 may be set to 0° and the pilot instructed to rotate the aircraft to 45° via the associated indicator lamp on the controller 31 to achieve the same effect.

While the invention has been described in its preferred embodiment, it is to be understood that the words which have been used are words of description rather than limitation and that changes within the purview of the appended claims may be made without departing from the true scope and spirit of the invention in its broader aspects.

We claim:

1. Apparatus for compensating for errors in the heading output signal of a magnetic azimuth detector mounted in an aircraft, comprising
    inertial heading reference means for providing a heading reference signal in accordance with the heading of said aircraft,
    heading compensation means responsive to said heading output signal and said heading reference signal for compensating said heading output signal for said errors in accordance with the differences between said heading output signal and said heading reference signal at a plurality of predetermined headings of said aircraft, and drift compensation means for compensating said heading reference signal for drift of said inertial heading reference means with respect to said plurality of predetermined headings, thereby providing a compensated heading output signal compensated for said errors.

2. The apparatus of claim 1 in which said drift compensation means includes means for providing a measure of elapsed time, said plurality of predetermined headings include an initial heading and a final heading, and said drift compensation means comprises means for compensating said heading reference signal for said drift in accordance with the values of said heading reference signal at said initial and final predetermined headings respectively and said measure of time elapsed therebetween.

3. The apparatus of claim 2 in which said initial and final predetermined headings comprise the same heading.

4. The apparatus of claim 1 in which said inertial heading reference means comprises directional gyroscope means.

5. The apparatus of claim 1 in which said magnetic azimuth detector and said inertial heading reference means comprise part of a gyro magnetic compass system for said aircraft, said inertial heading reference means comprising the directional gyroscope means thereof.

6. The apparatus of claim 1 in which said plurality of predetermined headings comprise eight points of the compass spaced 45 degrees apart.

7. The apparatus of claim 3 in which said plurality of predetermined headings comprise eight points of the compass spaced 45 degrees apart, said initial and final heading being zero degrees.

8. The apparatus of claim 3 in which said heading compensation means includes compensation signal generating means for generating heading compensation signals in response to said heading output signal and said heading reference signal at said plurality of predetermined headings, and compensation combining means for combining said heading compensation signals with said heading output signal thereby providing said compensated heading output signal.

9. The apparatus of claim 8 in which said heading compensation signal generating means includes compensation signal storage means for storing said heading compensation signal for application to said compensation combining means.

10. The apparatus of claim 9 in which said compensation signal generating means comprises means for generating heading compensation update signals in accordance with said differences between said heading output signal and said heading reference signal at said plurality of predetermined headings, said heading compensation means including means for updating said heading compensation signals stored in said compensation signal storage means with said heading compensation update signals.

11. The apparatus of claim 8 in which said aircraft is successively oriented at said plurality of predetermined headings and said drift compensation means comprises means for compensating said heading reference signal for drift in accordance with the difference in said values of said heading reference signal at said initial and final predetermined headings multiplied by the proportionate elapsed time at each predetermined heading with respect to the time elapsed between said initial and final predetermined headings.

12. The apparatus of claim 11 in which said drift compensation means further includes means for compensating said heading reference signal additionally in accordance with the difference in values of said heading output signal at said initial and final predetermined headings.

13. The apparatus of claim 8 further including compensation signal testing means responsive to said heading compensation signals for reperforming the compensation procedure when said heading compensation signals exceed a predetermined threshold.

14. The apparatus of claim 11 further including drift testing means responsive to said drift compensation means for reperforming the compensation procedure when said drift between said initial and final predetermined headings exceeds a predetermined threshold.

15. The apparatus of claim 3 in which said aircraft is successively oriented at said plurality of predetermined headings, said apparatus further including heading indicating means responsive to said heading reference signal to provide a heading indication to the pilot of said aircraft whereby in response to which said pilot orients said aircraft to said plurality of predetermined headings.

16. The apparatus of claim 15 in which said heading indicating means includes a predetermined heading indicium and said apparatus further includes means for offsetting said heading indicating means a predetermined amount from said heading indicium whereby said pilot orients said aircraft to the next predetermined heading by maneuvering the aircraft so that said heading indicating means is positioned from said predetermined offset to said predetermined heading indicium.

17. The apparatus of claim 16 in which said offsetting means further includes means for offsetting said heading indicating means in accordance with said predetermined offset and in accordance with the amount by which said pilot failed to achieve the desired previous predetermined heading.

18. Apparatus for compensating the heading output signal of a magnetic azimuth detector mounted in an aircraft for one and two cycle errors, said aircraft being oriented to the successive cardinal and inter-cardinal compass headings, one said heading being the initial and final heading of the compensation procedure, comprising directional gyroscope means for providing a heading reference signal in accordance with the heading of said aircraft, heading error compensation means responsive to said heading output signal and to compensation coefficient signals for compensating said heading output signal for said errors in accordance with said compensation coefficient signals, thereby providing a compensated heading output signal compensated for said errors, compensation coefficient signal storage means for providing said compensation coefficient signals to said heading error compensation means, compensation coefficient generating means responsive to said compensated heading output signal and said heading reference signal for generating compensation coefficient update signals in accordance with the differences between said compensated heading output signal and said heading reference signal at said cardinal and inter-cardinal headings of sad aircraft, means for updating said compensation coefficient signals stored in said storage means with said compensation coefficient update signals, and drift compensation means for compensating said heading reference signal for drift of said directional gyroscope means with respect to said cardinal and inter-cardinal headings of said aircraft.

19. The apparatus of claim 18 in which said drift compensation means comprises means for providing a measure of elapsed time, and means for compensating said heading reference signal for drift in accordance with the difference in said values of said heading reference signal at said initial and final headings multiplied by the proportionate elapsed time at each said cardinal and inter-cardinal heading with respect to the time elapsed between said initial and final headings.

20. The apparatus of claim 19 in which said drift compensation means further includes means for compensating said heading reference signal additionally in accordance with the difference in values of said heading output signal at said initial and final headings.

21. The apparatus of claim 20 in which said heading error compensation means compensates said heading output signal in accordance with $$\sin \psi \, mc = (C - \sin \psi \, fv)(1 + D) + E(B - \cos \psi \, fv)$$

$$\cos \psi \, mc = (C - \sin \psi \, fv)(1 + D)E + (B - \cos \psi \, fv)$$

where $\psi \, mc$ = said compensated heading output signal
$\psi \, fv$ = said heading output signal
B, C = one cycle compensation coefficients
D, E = two cycle compensation coefficients.

22. The apparatus of claim 21 in which said drift compensation means comprises means for compensating said heading reference signal in accordance with $$\text{DRIFT} = (\psi \, G_f - \psi \, G_i) - (\psi \, mc_f - \psi \, mc_i)$$

where $\psi \, G_f$ = the output of said directional gyroscope means at said final heading
$\psi \, G_i$ = the output of said directional gyroscope means at said initial heading
$\psi \, mc_f$ = said compensated heading output signal at said final heading
$\psi \, mc_i$ = said compensated heading output signal at said initial heading and $$\psi \, GC_{xx} = \psi \, G_{xx} \, \text{DRIFT} \, (t_{xx}/t_{total})$$

where $\psi \, GC_{xx}$ = drift compensated output of said directional gyroscope means at heading xx
$\psi \, G_{xx}$ = uncompensated output of said directional gyroscope means at heading xx
$t_{xx}$ = elapsed time at heading xx
$t_{total}$ = elapsed time between said initial and final headings.

23. The apparatus of claim 22 further including means responsive to said magnetic detector for providing a measure of the average magnitude of the magnetic field strength vector, and in which said compensation coefficient generating means comprises means for generating said compensation coefficient update signals in accordance with $$\epsilon_{xx} = \psi \, mc_{xx} - \psi \, GC_{xx}$$

where $\epsilon_{xx}$ = heading error at heading xx
$\psi \, mc_{xx}$ = said compensated heading output signal at heading xx
$\psi \, GC_{xx}$ = drift compensated output of said directional gyroscope means at heading xx, and $$B = \overline{V} \tan \frac{(\epsilon 270 - \epsilon 90)}{2}$$

$$C = \overline{V} \tan \frac{(\epsilon 180 - \epsilon 00)}{2}$$

$$D = 2 \tan \frac{(-\epsilon 45 + \epsilon 135 - \epsilon 225 + \epsilon 315)}{4}$$

$$E = \tan \frac{(-\epsilon 00 + \epsilon 90 - \epsilon 180 + \epsilon 270)}{4}$$

where $\overline{V}$ = average magnitude of magnetic field strength vector.

24. The apparatus of claim 18 in which said aircraft comprises a helicopter.

25. Method for compensating the heading output signal of a magnetic azimuth detector mounted in an aircraft for errors, said aircraft having an inertial heading reference, comprising the steps of orienting said aircraft successively to a plurality of predetermined headings, obtaining differences between the heading output signal of said magnetic azimuth detector and the heading reference signal from said inertial heading reference at said plurality of predetermined headings, compensating said heading reference signal for drift of said inertial heading reference with respect to said plurality of predetermined headings, and compensating said heading output signal for said errors in accordance with said differences between said heading output signal and said heading reference signal.

26. The method of claim 25 in which said orienting step includes orienting said aircraft to said plurality of predetermined headings including an initial heading and a final heading, and said drift compensating step comprises compensating said heading reference signal for said drift in accordance with the difference in the values of said heading reference signal at said initial and final predetermined headings multiplied by the proportionate elapsed time at each said predetermined heading with respect to the time elapsed between said initial and final predetermined headings.

27. The method of claim 26 in which said orienting step comprises orienting said aircraft successively to the successive cardinal and inter-cardinal compass headings, said initial and final headings comprising one said cardinal or inter-cardinal heading.

28. The method of claim 27 in which said initial and final headings comprise zero degrees.

29. The method of claim 27 in which said aircraft comprises a helicopter and said orienting step comprises the step of orienting said helicopter to said cardinal and inter-cardinal headings by lifting and rotating said helicopter successively thereto.

* * * * *

Disclaimer 4,143,467.—*James R. Erspamer, John R. Jackson, Roger A. Misch* and *John L. Waldrop,* Phoenix, Ariz. SEMI-AUTOMATIC SELFCONTAINED MAGNETIC AZIMUTH DETECTOR CALIBRATION APPARATUS AND METHOD. Patent dated Mar. 13, 1979. Disclaimer filed Aug. 26, 1981, by the assignee, *Sperry Corp.*

Hereby enters this disclaimer to claims 1, 4, 5, 6 and 25 of said patent.
[*Official Gazette November 17, 1981.*]